United States Patent
McMullan et al.

(10) Patent No.: US 9,727,673 B1
(45) Date of Patent: Aug. 8, 2017

(54) SIMULTANEOUS SIMULATION OF MULTIPLE BLOCKS USING EFFICIENT PACKET COMMUNICATION TO EMULATE INTER-BLOCK BUSES

(71) Applicant: Netronome Systems, Inc., Santa Clara, CA (US)

(72) Inventors: Jason Scott McMullan, Pittsburgh, PA (US); David Alton Welch, Pittsburgh, PA (US)

(73) Assignee: Netronome Systems, Inc., Santa Clara, CA (US)

( * ) Notice: Subject to any disclaimer, the term of this patent is extended or adjusted under 35 U.S.C. 154(b) by 0 days.

(21) Appl. No.: 14/885,978

(22) Filed: Oct. 16, 2015

(51) Int. Cl.
*G06F 17/50* (2006.01)

(52) U.S. Cl.
CPC ...... *G06F 17/5009* (2013.01); *G06F 17/5081* (2013.01)

(58) Field of Classification Search
CPC .......... G06F 17/5022; G06F 17/5027; G06F 11/1044; G06F 11/1068; G06F 11/108; G06F 2217/86; G06F 11/1048; G06F 12/0246; G06F 11/1076; G06F 11/2094; G06F 13/22; G06F 13/4291; G06F 17/5036
USPC ................................................ 716/100–108
See application file for complete search history.

(56) References Cited

U.S. PATENT DOCUMENTS

| | | | |
|---|---|---|---|
| 2005/0034090 A1* | 2/2005 | Sato | G06F 17/5045 716/103 |
| 2006/0015313 A1* | 1/2006 | Wang | G06F 17/5027 703/14 |
| 2013/0125074 A1* | 5/2013 | Mansouri | G06F 17/5022 716/111 |

* cited by examiner

*Primary Examiner* — Binh Tat
(74) *Attorney, Agent, or Firm* — Imperium Patent Works LLP; T. Lester Wallace; Mark D. Marrello

(57) ABSTRACT

An integrated circuit includes a first circuit, a second circuit, and a bus that couples the circuits together. The first circuit is simulated on a first simulator at the same time that the second circuit is simulated on a second simulator. A simulator plug-in is incorporated into the simulation model of the first circuit. A simulator plug-in is incorporated into the simulation model of the second circuit. If valid data is to pass from the first to second circuit across the bus during simulation, then the plug-in of the first model causes a network stack to generate a packet. The packet carries the data. After communication to the second simulator, the data is recovered from the packet, and is injected by the plug-in of the second model into the simulation of the second circuit. By exchanging data back and forth this way, multiple circuits are simulated simultaneously on different simulators.

23 Claims, 4 Drawing Sheets

INTEGRATED CIRCUIT TO BE SIMULATED

CIRCUITS TO BE SIMULATED
(EACH CIRCUIT HAS A SIMULATOR PLUG-IN ADDED)

SIMULATING A CIRCUIT USING
TWO SIMULATORS

TICK AND DATA PACKET

TICK PACKET

SIMULATING A CIRCUIT USING TWO PROCESSORS OF
THE SAME COMPUTER

US 9,727,673 B1

SIMULTANEOUS SIMULATION OF MULTIPLE BLOCKS USING EFFICIENT PACKET COMMUNICATION TO EMULATE INTER-BLOCK BUSES

TECHNICAL FIELD

The described embodiments relate generally to the simulation of digital circuits using digital circuit simulators, and to related structures and methods.

INCORPORATION-BY-REFERENCE OF MATERIAL SUBMITTED AS A TEXT FILE VIA THE OFFICE ELECTRONIC FILING SYSTEM (EFS-WEB)

In accordance with 37 CFR 1.96(c), this application includes an ASCII text file appendix containing source code to software that embodies the inventions described herein. All the material on the ASCII text file appendix his hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights. The ASCII text file appendix includes fifteen text files created on Oct. 13, 2015 and readable in the MS-Windows operating system. The ASCII file appendix includes the follow ASCII files: 1) Makefile.txt (2 kilobytes); 2) testbench_single_vcd.txt, (128 kilobytes); 3) testbench_node_1_vcd.txt, (91 kilobytes); 4) testbench_node_2_vcd.txt, (103 kilobytes); 5) remote_bus_h.txt, (3 kilobytes); 6) remote_bus_c.txt, (5 kilobytes); 7) sig_h.txt, (1 kilobytes); 8) stub_c_in.txt, (1 kilobytes); 9) ab_rx_bus_c.txt, (3 kilobytes); 10) ab_tx_bus_c.txt, (3 kilobytes); 11) ab_rx_bus_v.txt, (1 kilobytes); 12) ab_tx_bus_v.txt, (1 kilobytes); 13) island_v.txt, (3 kilobytes); 14) testbench_single_v.txt, (2 kilobytes); and 15) testbench_node_v.txt, (3 kilobytes).

BACKGROUND INFORMATION

As the complexity and gate-count of integrated circuits increase, the amount of time required to simulate such large and complex integrated circuits increases as well. Many of the larger integrated circuits include multiple processors, and multiple blocks of other circuitry, and have internal buses, and multiple peripheral circuits that communicate with the processors via the internal buses. Ways of reducing the simulation time of such large integrated circuits are sought.

SUMMARY

An integrated circuit to be simulated includes a first circuit portion, a second circuit portion, and a bus structure that couples the two circuit portions together. The first circuit is simulated on a first simulator at the same time that the second circuit is simulated on a second simulator. A compiled simulator plug-in (for example, a compiled version of a VPI plug-in) is incorporated into the simulation model of the first circuit portion, and a compiled simulator plug-in (for example, a compiled version of a VPI plug-in) is incorporated into the simulation model of the second circuit portion. If valid data is to pass from the first circuit portion, and across the bus structure during the simulation to the second circuit portion, then the plug-in in the model of the first circuit portion causes a network stack to generate a packet, where the packet carries the data. The packet is effectively communicated via network communication from the first simulator to the second simulator. The packet is processed up a network stack such that the data is recovered from the packet. The plug-in in the model of the second circuit then injects the data into the simulation of the second circuit. In similar fashion, if data is to be passed from the second circuit portion, and across the bus structure during the simulation, and to the first circuit portion, the plug-ins in the models of the circuits being simulated are used to communicate the data via packet communication from the second circuit portion simulation to the first circuit simulation. By such exchange of data, the two circuit portions can be simulated simultaneously on different simulators. Where the integrated circuit to be simulated includes many circuit portions that are interconnected by the bus structure, but otherwise are substantially separate, each of the circuit portions can be simulated separately on a different simulator executing on a different computer. The simulators intercommunicate data, that during the simulation is to be passing between circuit portions across the bus structure, using packet communication.

During some time periods, a circuit portion may not have valid data to send onto the bus structure, whereas in other time periods the circuit portion does have valid data to send onto the bus structure. In one example, a plug-in in the circuit model of the circuit portion monitors the digital logic value of a valid signal at a bus interface circuit of the circuit portion. If the valid signal indicates that there is no valid data to be supplied by the circuit portion onto the bus structure then the plug-in does not cause a packet to be generated that carries packet data. A smaller synchronization packet may, however, be generated that does not carry bus data. If, on the other hand, the plug-in in the circuit model of the circuit portion monitors the digital logic value of the valid signal, and if the valid signal indicates that there is valid data to be supplied by the circuit portion to the bus structure, then the plug-in issues a function call to a network stack. The function call causes the network stack to generate a packet that carries the data. The data is carried by the packet, and is recovered from the packet by a network stack, and is supplied to the simulator that is simulating the other circuit portion that in the actual overall design would have received the data via the bus structure. Using the valid signal in this way reduces the amount of packet traffic involved in carrying out the above-described simultaneous simulation of multiple circuit portions.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

Figure 1:
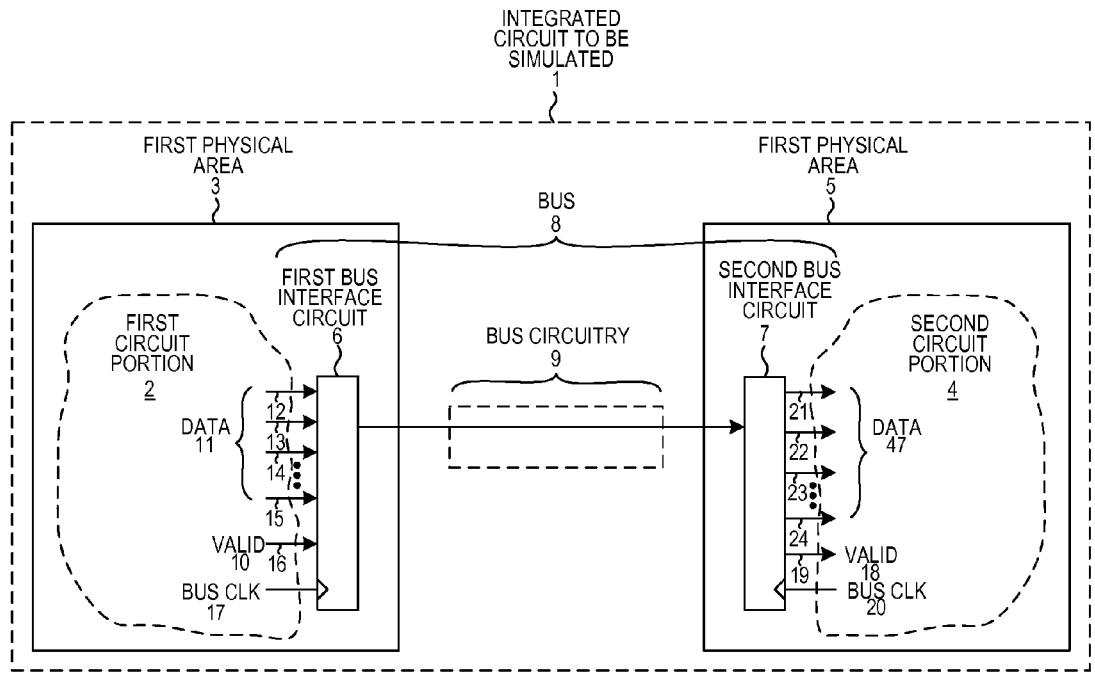
FIG. 1 is a simplified diagram of an integrated circuit to be simulated, where the integrated circuit includes a first circuit portion and a second circuit portion that are interconnected by a bus.

FIG. 1 is a simplified diagram of an integrated circuit to be simulated.

Figure 2:
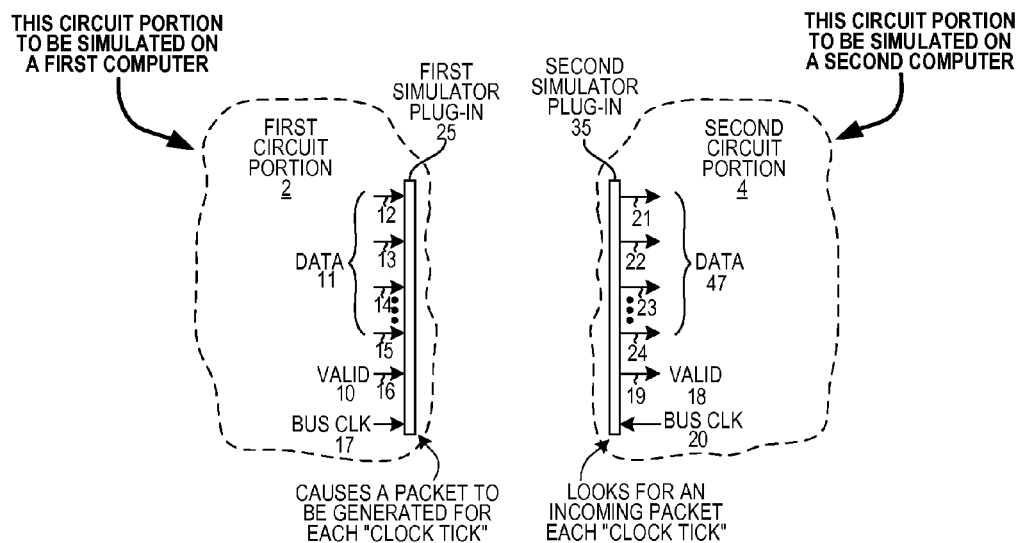
FIG. 2 is a diagram that illustrates how simulation circuit models of first and second circuit portions are each made to include simulator plug-ins.

FIG. 2 is a diagram that illustrates simulator plug-ins that are employed in simulating the integrated circuit of FIG. 1.

Figure 3:
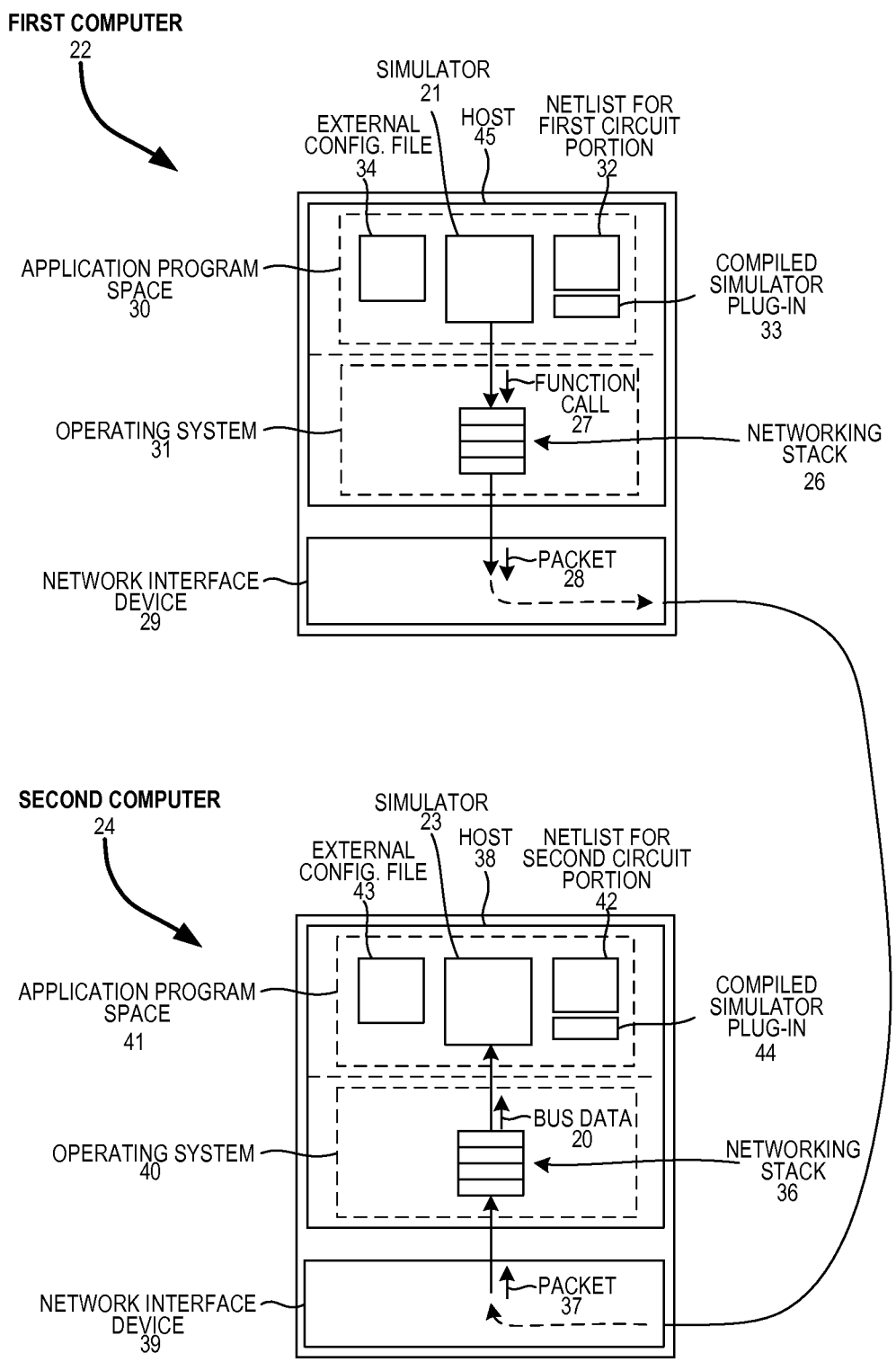
FIG. 3 is a diagram showing the simultaneous simulation of the first circuit portion by a first simulator on a first computer and the second circuit portion by a second simulator on a second computer, where data is passed between the first and second simulators using packet communication.

FIG. 3 is a diagram that illustrates how a first circuit portion of the integrated circuit is simulated on a first computer while a second circuit portion of the integrated circuit is simultaneously simulated on a second computer.

As shown in FIG. 1, the integrated circuit 1 includes a first circuit portion 2 located in a first physical area 3 of the integrated circuit, a second circuit portion 4 located in a second physical area 5 of the integrated circuit, and a bus 8 that couples the first circuit portion to the second circuit portion. The bus 8 includes a first bus interface circuit 6 in the first physical area, a second bus interface circuit 7 in the second physical area, and bus circuitry 9. In one simplistic example, the bus circuitry 9 includes a set of parallel wires that extends from the first bus interface circuit 6 to the second bus interface circuit 7. In a second more realistic example, the bus 8 is more complex circuit. The bus circuitry 9 includes many sets of parallel-extending conductors, many crossbar switches, and many FIFO (First In First Out) memories and circuitry for buffering data passing across the bus, and buffers, and other active circuitry. The bus 8 can be a simple bus, or a complex bus. Although the bus 8 is bidirectional in that bus communications can be sent from the first bus interface circuit 6 to the second bus interface circuit 7, and in the opposite direction from the second bus interface circuit 7 to the first bus interface circuit 6, the simplified diagram of FIG. 1 only shows circuitry and information flow for one direction of communication from the first bus interface circuit 6 to the second bus interface circuit 7. It is understood, however, that even for this very simple bus structure, there is an additional structure for communicating across the bus 8 in the opposite direction from the second bus interface circuit 7 to the first bus interface circuit 6.

The bus 8 is a bus that during normal operation of the integrated circuit 1 communicates bus data during certain times (for example, during certain bus cycles) but does not communicate bus data during other times (for example, during other certain bus cycles). For example, in a first bus clock cycle involving the first bus interface circuit 6 there is bus data communicated from the first circuit portion 2 to the first bus interface circuit 6 so that the first bus interface circuit 6 can in turn communicate the bus data across the bus, whereas in a second bus clock cycle involving the first bus interface circuit 6 there is no bus data communicated from the first circuit portion 2 to the first bus interface circuit 6 so that the first bus interface circuit 6 will then communicate the bus data across the bus. There may be relatively long periods of time during which the first circuit portion 2 is not outputting bus data to the bus interface circuit 6. If a valid signal 10 on conductor 16 is asserted during a bus clock cycle of the bus clock 17 for the first bus interface circuit 6, then data 11 present on conductors 12-15 is deemed "valid" bus data and is latched into the first bus interface circuit 6 during the bus clock cycle so that the latched in bus data can then be communicated across the bus. For a given cycle of the bus clock used by the first interface circuit 6, there may or may not be "valid" bus data to be latched into the bus interface circuit 6.

Likewise, the second bus interface circuit 7 may not output "valid" bus data on each cycle of the bus clock 20 used by the second bus interface circuit 7. There may be relatively long periods of time during which bus data is not being passed from second bus interface circuit 7 to the second circuit portion 4. If the valid signal 18 on conductor 19 is not asserted during a particular bus clock cycle of the bus clock signal 20 used by the second bus interface circuit 7, then the second bus interface circuit 7 is not supplying bus data to the second circuit portion 4 at that time. The digital logic values on the data conductors 21-24 do not represent legitimate data. On the other hand, if the signal valid 18 is asserted during a bus clock cycle then the second bus interface circuit 7 is supplying legitimate bus data on conductors 21-24 to the second circuit portion 4.

In accordance with one novel aspect, the first circuit portion 2 is simulated by a first digital logic simulator 21 executing on a first computer 22 at the same time that the second circuit portion 4 is simulated by a second digital simulator 23 executing on a second computer 24. The two simulators, while performing their simulations, exchange data using packet communication. The first computer 22 and the second computer 24 are illustrated in FIG. 3. The first circuit portion 2 is described in some fashion for input to the first digital logic simulator. For example, the first circuit portion 2 may be described as a gate-level netlist 32, where elements in the netlist are representations of digital logic components. Alternatively, the first circuit portion 2 may be described operationally as a high-level programming language model such as a model written in the C programming language. In either case, the description of the first circuit portion 2 is "compiled" or otherwise converted into an amount of executable code, the execution of which models operation of the first circuit portion. The first simulator uses, or works in conjunction with, this amount of executable code so as to determine, for each node in the circuit being simulated, the digital logic state present on that node at each of a sequence of times. The second circuit portion 4 is described in a similar fashion for input to the second digital logic simulator.

To facilitate the simultaneous digital logic simulation on the two different computers 22 and 24, a first simulator plug-in 25 is added to the description of the first circuit portion 2. The first simulator plug-in 25 is illustrated in FIG. 2. The first simulator plug-in 25, in one example, is a compiled version of a VPI (Verilog Procedure Interface). The compiled version 33 of the first simulator plug-in is illustrated in FIG. 3. When this compiled code is executed, it serves within the simulator environment to monitor the digital logic value of the simulated valid signal 10 during simulation. If the state of the valid signal 10 during simulation indicates that bus data 11 as being output by the first circuit portion 2 is to be communicated across the bus 8, then execution of the first simulator plug-in 18 causes a function call 27 to occur. The function call 27 communicates the bus data 11 from simulated conductors 12-15 to the network stack 26 of the first computer 22 upon which the first simulator 21 is executing. The first simulator 21 is the simulator that is simulating the first circuit portion 2. The function call 27 causes the network stack 26 to generate a packet 28 and to output the packet 28 from the first computer 22 via the Network Interface Device (NID) 29 of the first computer 22. An external configuration file 34 stores information used to generate the packet 28 including the IP destination address of the packet, and SCTP header information. For each transmitting simulator plug-in in the simulated circuit, the external configuration file specifies what corresponding receiving simulator plug-in to connect to. NID 29 is, for example, a Network Interface Card (NIC) that plugs into a host portion 45 of the first computer. The first simulator 21 is executing in application program space 30, on top of the operating system 31, on the first computer 22. The network stack 26 is considered to be a part of the operating system 31 of the first computer 22.

If, on the other hand, during the simulation the state of the valid signal 10 during the simulated bus cycle indicates that no bus data is being received by the first bus interface circuit 6 for communication across the bus 8, then execution of the first simulator plug-in 25 does not cause a function call to occur, where the function call communicates bus data to the network stack 26. Accordingly, if there is no data being received by the bus 8 from the first circuit portion 2 during a given bus cycle, then no function call is made to the network stack 26 to send bus data out of the first computer in the form of a packet.

A second simulator plug-in 35 is added to the description of the second circuit portion 4. If the network stack 36 executing on the second computer 24 has received a packet 37 destined for a destination IP address associated with the second simulator plug-in, where the packet carried bus data 47, then the complied version 44 of the second simulator plug-in receives the bus data 47 from the network stack 36 and simulates insertion of the bus data 47 onto simulated conductors 21-24 of the second circuit portion 4. The receive side simulator plug-in gets called on every simulated clock tick, giving it an opportunity to check for a packet being supplied from the network stack. In the synchronous mode, it stalls the simulation being performed by the second simulator, and waits for inbound packets until the next clock tick packet arrives. When the packet arrives, execution of the compiled version 44 of the second plug-in causes the simulated valid signal 18 on simulated conductor 19 to be asserted at the appropriate time in the bus cycle of the bus clock signal 46 so that the second circuit portion 4 being simulated can simulate receiving and using the inbound bus data 47 as it would were the bus data 47 being supplied by the second bus interface circuit 7.

There is also an asynchronous mode. In the asynchronous mode, the receiving simulator plug-in checks for any available bus signal packets, sets up the output signals as specified by the packet, and causes simulation to resume without waiting for a new clock tick.

The second computer 24 is of similar composition as the first computer 22 in this example. Second computer 24 includes a host portion 38, and a NID 39. An operating system 40 is executing on the host portion 38, and the network stack 36 is considered to be a part of the operating system. The second simulator 23 executes as an application layer program in application program space 41. The netlist 42 for the second circuit portion 4 as well as, or including, the compiled version 44 of the second simulator plug-in, are also in application program space 41. When valid bus data 47 is to be supplied onto simulated conductors 21-24, execution of compiled version 44 of the second simulator plug-in causes the simulated valid signal 18 on simulated conductor 19 to be asserted for the bus cycle during which the bus data 47 is valid. An external configuration file 43 stores information used to generate packets that pass in the opposite direction from the second computer 24 to the first computer 22.

In addition to the mechanism described here for communicating bus data in the form of packets during simulation from the first circuit portion as it is being simulated to the second circuit portion as it is being simulated, there is a similar mechanism (not shown) for communicating bus data in the form of packets during simulation from the second circuit portion as it is being simulated to the first circuit portion as it is being simulated.

Figure 4:
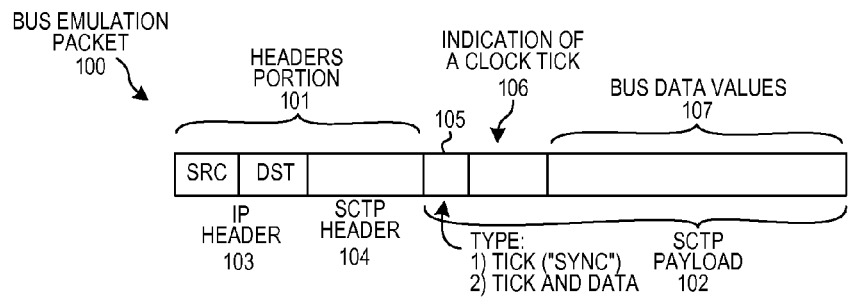
FIG. 4 is a diagram of a first type of bus emulation packet that can be sent between simulators to facilitate simultaneous simulation of the first and second circuit portions.

FIG. 4 is a diagram illustrating the form of a bus emulation packet 100 that communicates simulation bus data as described above. The packet 100 includes a header portion 101 and an SCTP payload portion 102. SCTP is an example of a stateless and connectionless network protocol that is especially suited to communication of bus emulation packets in the novel methods described here. The header portion 101 includes an IP header 103 and an SCTP header 104. The packet 100 is actually an IP packet, and the IP destination address portion of the IP header identifies an IP destination associated with the other simulator (the simulator that is to receive and use the bus data carried by the packet 100). The SCTP payload portion 102 includes a type field 105, an indication of a clock tick field 106, and a field 107 that carries a plurality of bus data values. The type field 105 contains a code that indicates whether the packet is a packet (of the form of FIG. 5) used for bus emulation as described above but where the packet does not carry any bus data, or whether the packet is a packet (of the form of FIG. 4) used for bus emulation as described above but where the packet does carry bus data. The clock tick in the present example is not a simulation time, and is not a an indication of a clock tick of a clock signal used to clock the circuit portion, but rather is a number of a clock tick of the bus clock used by the bus interface unit. For example, in the case of the packet 100 being a packet output by the first simulator plug-in 25 of FIG. 2, the clock tick field 106 of the packet would carry a number, where that number identifies a particular bus clock cycle of the bus clock signal 17, where the identified bus clock cycle is the cycle when the bus data carried in the packet was being supplied as valid data by the first circuit portion 2 to the first simulator plug-in 25.

Figure 5:
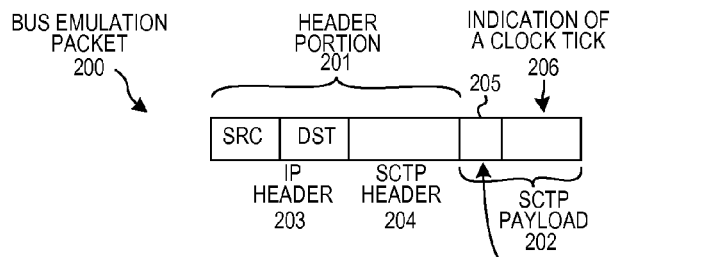
FIG. 5 is a diagram of a second type of bus emulation packet that can be sent between simulators to facilitate simultaneous simulation of the first and second circuit portions.

FIG. 5 is a diagram illustrating the form of a bus emulation packet 200 that communicates clock tick information, but that does not include any bus data. On a bus clock cycle when the first simulator plug-in is not receiving valid bus data to be communicated across the bus 8, there is no bus data to be communicated. Consequently, a packet of the form of FIG. 4 is not output from the network stack 26, but rather a packet of the form of FIG. 5 is output from the network stack 26. The packet 200 has a header portion 201 and a SCTP payload portion 202, and otherwise is of the same form as the packet 100 of FIG. 4, except that the packet 200 of FIG. 5 has no field that carries bus data values. The IP header 203 is used to direct to the packet 200 to the other simulator (the simulator that is simulating the other portion of the circuit and that is to receive and use the packet 200). The header portion 201 also includes an SCTP header 204 as in the case of the packet 100 of FIG. 4. The code carried in the type field 205 indicates that the packet is of the type shown in FIG. 5, and is not of the type shown in FIG. 4. The field 206 of packet 200, like the field 107 of the packet 100 of FIG. 4, carries an indication of the clock tick of the bus clock used by the relevant bus interface circuit.

As the first simulator 21 simulates the first circuit portion 2 on the first computer 22, and as the second simulator 23 simulated the second circuit portion 4 on the second computer 24, the two simulators pass simulation state data back and forth using packet communication. In the real circuit to be simulated, a bus or bus structure couples the first and second circuit portions together. Rather than simulating this bus or bus structure, simulator plug-ins are employed in the first and second circuit portions to emulate communication across the bus. Bus operation is emulated using packet communication. In one novel aspect, the amount of data intercommunicated between the two simulators in packet form, due to the bus emulation as described above, is reduced by not sending bus data in a bus emulation packet unless there would have been valid bus data to be sent across the actual bus or bus structure.

In one specific example, the first circuit portion is an embedded processor such as, for example, a processor that executes an ARM instruction set or an Intel IXA microengine (ME) instruction set or another widespread embedded processor instruction set. The embedded processor communicates with other circuitry of the integrated circuit via a bus. The design of the processor may, for example, be provided by a first entity (for example, a first company) to second entity (for example, a second company) that is designing the overall integrated circuit. The first entity is an IP vendor who supplies the second entity a simulation model of the processor, along with a mask design usable to fabricate the processor in hardware. The simulation model is a compiled version of a C programming code model of the processor, where the C programming code was compiled along with bus emulation simulator plug-ins as described above. The second entity receives information and instructions from the first entity on how to incorporate corresponding simulator plug-ins into the compiled design for the second circuit portion 4. The information and instructions explain how the first circuit portion (the processor) can be simulated on a first computer at the same time that the second circuit portion can be simulated on a second computer, with communications between the two simulators occurring in the form of bus emulation packets. The designer of the overall integrated circuit need not understand the details of the simulation model provided by the first entity, but rather only needs to develop a simulation model for the second circuit portion that uses the standardized simulator plug-ins. This technique is particularly useful in the design of large integrated circuits, where there are many blocks of circuitry in the integrated circuit, and where the various blocks only intercommunicate with each other, or largely only intercommunicate with each other, using a standard on-chip bus structure. The processor design is usually supplied by the first entity with a bus interface for communicating across a particular standard bus, so the simulator plug-ins are easily provided in the simulation model by the first entity. In the design of a large integrated circuit having many blocks, each of the blocks can be simulated on a separate computer, with all of the simulations occurring simultaneously. Where individual IP design houses supply the designs of individual ones of the blocks, each individual design house can supply a simulation model for its block such that the simulation model includes the emulation packet communicating simulator plug-ins described above. In this respect, the novel use of simulator plug-ins described above facilitates the modular design of large integrated circuits.

Although an example is described above where the first and second circuit portions 2 and 4 are simulated on different computers, advantages of the novel simulation method are also realized when the first and second circuit portions are simulated on the same computer. In many cases, the CPU (Central Processing Unit) of a host computer actually comprises multiple processor cores. Each of those processor cores can be simultaneously executing a number of threads. Nonetheless, if the overall integrated circuit being simulated is from a single compiled netlist or model of the overall integrated circuit, then the simulator program that is using the compiled netlist or model and that is determining the logic values on all the various nodes of the overall circuit can only execute on one thread of one of the processors at a given time. Even though the CPU may have multiple processor cores, each of which can execute multiple threads, the multiple threads and multiple cores cannot be used to increase simulation speed.

Figure 6:
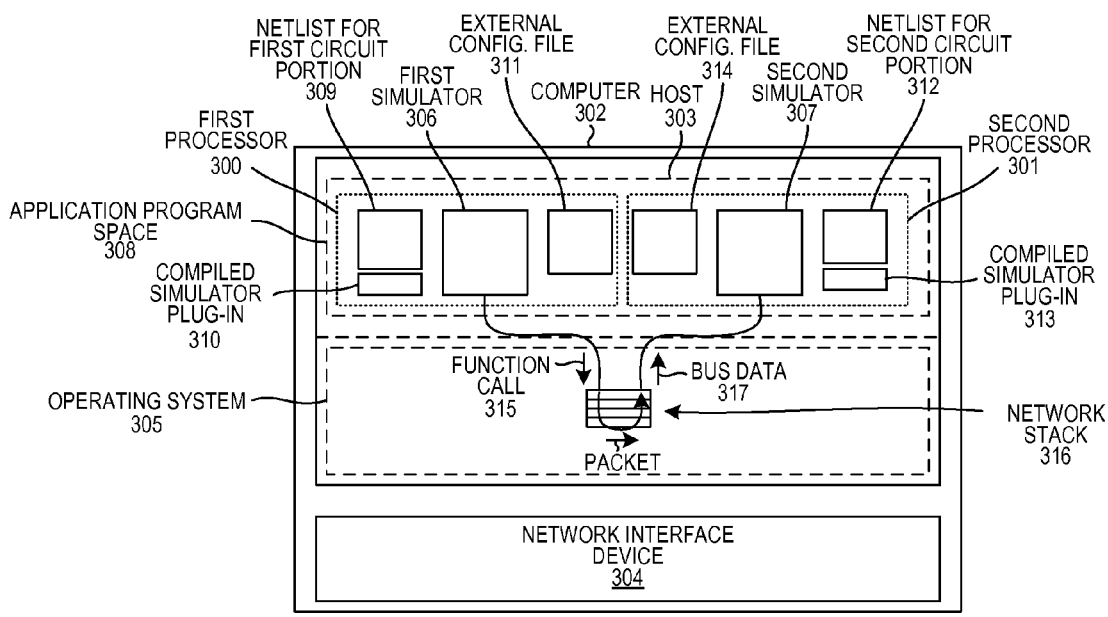
FIG. 6 is a diagram showing how the first and second circuit portions can be simultaneously simulated by two different simulators executing on different processors within the same computer, where data is passed between the simulators using packets, but where the packets do not leave the computer.

FIG. 6 is a diagram that illustrates the two circuit portions 2 and 4 of FIG. 1 being simulated on two processor cores 300 and 301 of the same computer 302. Computer 302 comprises a host 303 and NID 304. There is an operating system 305 executing on the host. Both a first simulator 306 and a second simulator 307 are executing in application program space 308 on the host. In one example, these are two instances of the same simulator. The first simulator 306 simulates a compiled netlist 309 for the first circuit portion. Reference numeral 310 identifies the compiled simulator plug-in described above in connection with FIGS. 1-3. Reference numeral 311 identifies the external configuration file described above in connection with FIGS. 1-3. This first simulator 306 and the compiled netlist 309 and the compiled simulator plug-in 310 are executed by the first processor 300. Similarly, the second simulator 307 simulates a compiled netlist 312 for the second circuit portion. Reference numeral 313 identifies the compiled simulator plug-in described above in connection with FIGS. 1-3. Reference numeral 314 identifies the external configuration file described above in connection with FIGS. 1-3. This second simulator 307 and the compiled netlist 312 and the compiled simulator plug-in 313 are executed by the second processor 301. When a plug-in executing on the first processor 300 as described above in connection with FIGS. 1-3 makes a function call 315 to the network stack 316 to output bus data in the form of the payload of a packet, the resulting packet is not sent out of the computer as in the example of FIGS. 1-3, but rather the resulting packet passes back up the same network stack 316 to an IP destination located on the same computer 302. The network stack 316 receives the packet just as it would receive a packet received from a source outside the computer 302. The network stack 316 determines from the header of the packet that the packet is destined for the second simulator 307 executing on the second processor 301, so the network stack 316 supplies the payload bus data 317 to the second simulator 307. The second simulator plug-in 313 in turn receives the bus data 317, and supplies the bus data to the second circuit portion being simulated. Operation of the plug-ins and the use of the valid signals and clock tick information is the same as described above in connection with FIGS. 1-3, except that in this case the generated emulation packets do not leave the computer 302 but rather pass back up the network stack 316 such that their bus data is directed to another simulator on the same computer. The two simulators 306 and 307 are therefore able to simulate the first and second circuit portions simultaneously, thereby increasing simulation speed of the overall integrated circuit.

Figure 7:
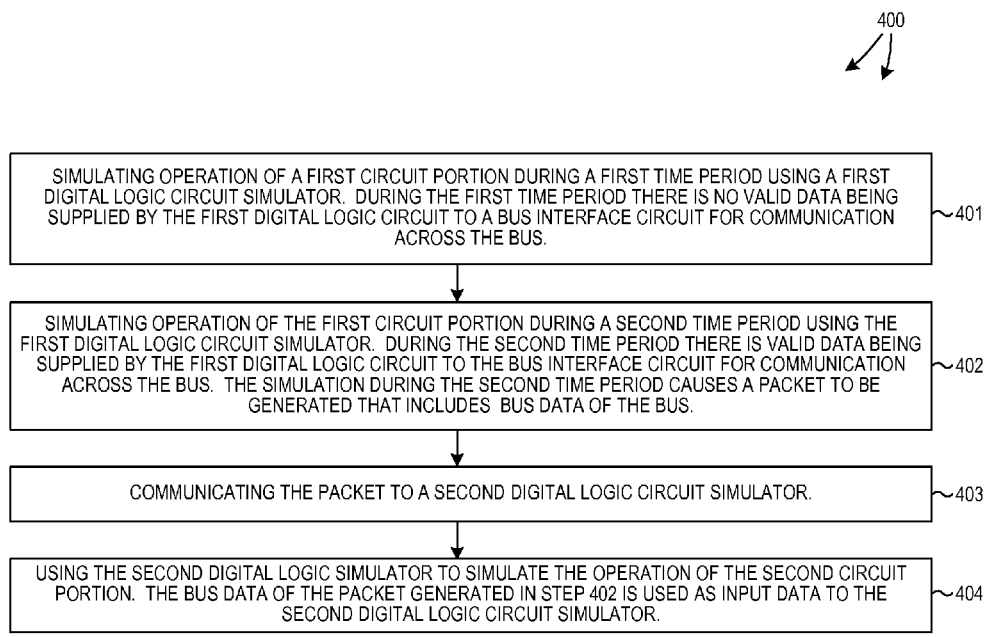
FIG. 7 is a flowchart of a method 400 in accordance with one novel aspect.

FIG. 7 is a flowchart of a method 400. Method 400 is a method of simulating a first circuit portion of a circuit and a second circuit portion of the circuit where the first circuit portion and the second circuit portion are coupled together by a bus. In Step 401, a first digital logic circuit simulator is used to simulate operation of the first circuit portion during a first time period. During the first time period there is no valid data being supplied by the first digital logic circuit to a bus interface circuit for communication across the bus. The simulation of step 401 does not cause any packet to be generated that includes bus data of the bus. In Step 402, the first digital logic circuit simulator is used to simulate operation of the first circuit portion during a second time period. During the second time period there is valid data being supplied by the first digital logic circuit to the bus interface circuit for communication across the bus. The simulation of Step 402 causes a packet to be generated that does include bus data of the bus. In Step 403, the packet generated in Step 402 is communicated to a second digital logic circuit simulator. In Step 404, the second digital logic circuit simulator is used to simulate operation of the second circuit portion. The bus data of the packet generated in Step 402 is used as input data to the second digital logic circuit simulator in Step 404.

An ASCII file appendix including fifteen ASCII files is incorporated into the present application. A file name ending in "c.txt" is source code in the C programming language. The C-code of the files listed below was compiled into machine code using the shareware C compiler, GNU Compiler Collection (GCC). A file name ending in "v.txt" is a Verilog hardware description language file. The verilog code of the files listed below was elaborated into machine code using the Icarus Verilog simulator. The files are grouped into three groups:

The first group of ASCII text files includes "ab_rx_bus_c.txt", "ab_tx_bus_c.txt", and "stub_c_in.txt" which together implement a simulator plug-in. ASCII file "stub_c_in.txt" is used to generate a secondary file that builds the plug-in, such as the first simulator plug-in 25 shown in FIG. 2. ASCII files "ab_rx_bus_c.txt" and "ab_tx_bus_c.txt" are also used to build the simulator plug-in that converts the bus signals to a call to the plug-in. ASCII files "ab_rx_bus_c.txt" and "ab_tx_bus_c.txt" are part of the plug-in sides of the bus interface (25 and 35 of FIG. 2).

A second group of ASCII text files including "ab_rx_bus_v.txt", "ab_tx_bus_v.txt", "island_v.txt", "testbench_single_v.txt", and "testbench_node_v.txt" which are used to implement the physical circuits to be simulated. ASCII text files "ab_rx_bus_v.txt" and "ab_tx_bus_v.txt" wrap the netlist signals into a call to the plug-in. ASCII text file "island_v.txt" is the circuit being simulated, such as the first circuit portion 2 shown in FIG. 1. In the present example, "island_v.txt" reads data from a first and second bus and generates a pattern. In this example, "island_v.txt" is used as the first circuit portion and the second circuit portion. ASCII text file "testbench_node.txt" is verilog code that simulates a first node (first circuit portion) separately from a second node (second circuit portion) using the transmit and receive plug-ins discussed above. ASCII text file "testbench_single.txt" is verilog code that takes two nodes and directly wire them together without using the plug-in. ASCII text file "testbench_single.txt" is only provided as a reference to compare with the plug-in embodiment ("testbench_node.txt").

A third group of ASCII text files including "remote_bus_h.txt", "remote_bus_c.txt", and "sig_h.txt" which implements the sending and receiving of packets by the plug-in, such as simulator plug-ins 25 and 35 shown in FIG. 2. ASCII text file "sig_h.txt" is a header file that allows the plug-in code to be read by a human using the simulator. ASCII text file "remote_bus_h.txt" is a header file that describes the remote bus interface API so that the plug-in can call-in to get a remote bus connection from TX bus to RX bus or RX bus to TX bus. ASCII text file "remote_bus_c.txt" includes a remote bus connect that connects to the bus when necessary and a remote bus disconnect that disconnects from the bus whenever necessary. ASCII text file "remote_bus_c.txt" also includes a remote bus transmit and a remote bus receive function to transmit or receive bus data as described above.

A fourth group of ASCII text files including "Makefile.txt", "testbench_single_vcd.txt", "testbench_node_1_vcd.txt", and "testbench_node_2_vcd.txt". The vcd files are ASCII-based format files that store output data generated by logic simulations. ASCII text file "testbench_single_vcd.txt" stores the output data generated by a logic simulator when the first node (first circuit portion) is directly connected to the second node (second circuit portion). ASCII text files "testbench_node_1_vcd.txt" and "testbench_node_2_vcd.txt" store output data generated by the a logic simulator when the first node (first circuit portion) and the second node (second circuit portion) are not directly connected, but rather communicate using the plug-in. ASCII text file "Makefile.txt" is used to build from the source files by organizing the code and its compilation and linking.

Although certain specific embodiments are described above for instructional purposes, the teachings of this patent document have general applicability and are not limited to the specific embodiments described above. In some embodiments, the first circuit portion and the first bus interface circuit together are an ARM processor, and the bus is an Advanced Microcontroller Bus Architecture (AMBA) standard bus. In some embodiments, the first physical area is an island in a multi-island Network Flow Processor (NFP) integrated circuit, and the bus is a Command/Push/Pull (CPP) bus. Accordingly, various modifications, adaptations, and combinations of various features of the described embodiments can be practiced without departing from the scope of the invention as set forth in the claims.

What is claimed is:

1. A method of simulating a first circuit portion of a circuit and a second circuit portion of the circuit, wherein the first circuit portion and the second circuit portion are coupled together by a bus, the method comprising:

(a) using a first digital logic circuit simulator to simulate operation of the first circuit portion during a first time period, wherein during the first time period a valid signal is generated by the first digital logic circuit simulator that indicates that there is no valid data being supplied by the first digital logic circuit to a bus interface circuit for communication across the bus, wherein the simulation of (a) does not cause any packet to be generated that includes bus data of the bus, and wherein the first digital logic circuit simulator is executing on a computer;

(b) using the first digital logic circuit simulator to simulate operation of the first circuit portion during a second time period, wherein during the second time period a second valid signal is generated by the first digital logic circuit simulator that indicates that there is valid data being supplied by the first digital logic circuit to the bus interface circuit for communication across the bus, and wherein the simulation of (b) causes a packet to be generated that does include bus data of the bus;

(c) communicating the packet of (b) to a second digital logic circuit simulator; and (d) using the second digital logic circuit simulator to simulate operation of the second circuit portion, wherein the bus data of the packet generated in (b) is used as input data to the second digital logic circuit simulator in (d).

2. The method of claim 1, wherein the first circuit portion during the simulation of (a) and (b) supplies the first valid signal to the bus interface circuit, and wherein execution of a compiled version of a simulator plug-in monitors the first valid signal during the simulation of (a) and the second valid signal during the simulation of (b).

3. The method of claim 2, wherein the compiled version of the simulator plug-in determines that the valid signal is not asserted during the simulating of (a) and as a result does not cause any packet to be generated that includes bus data of the bus, and wherein the compiled version of the simulator plug-in determines that the valid signal is asserted during the simulating of (b) and as a result causes the packet of (b) to generated that includes the bus data.

4. The method of claim 1, wherein an operating system is executing on the computer, wherein the operating system comprises a network stack, and wherein the simulation of (b) causes the packet to be generated by issuing a function call to the network stack of the operating system.

5. The method of claim 1, wherein the first digital logic circuit simulator is executing on a first computer, and wherein the second digital logic circuit simulator is executing on a second computer, and wherein the packet is communicated in (c) from the first computer to the second computer.

6. The method of claim 1, wherein the first digital logic circuit simulator is executing on a first computer, and wherein the second digital logic circuit simulator is executing on a second computer, and wherein the packet is communicated in (c) across a network from the first computer to the second computer.

7. The method of claim 1, wherein the first digital logic circuit simulator is executing on a first processor of a computer, and wherein the second digital logic circuit simulator is executing on a second processor of the computer, and wherein the packet is communicated in (c) from the first processor, through a network stack, and to the second processor without leaving the computer.

8. The method of claim 1, wherein the packet communicated in (c) comprises: 1) an indication of a clock tick, and 2) the bus data.

9. The method of claim 1, wherein the packet communicated in (c) comprises: 1) an indication of a time, and 2) the bus data.

10. The method of claim 1, wherein the simulation of the first circuit portion in (a) and (b) involves executing a compiled version of a simulator plug-in, wherein execution of the compiled version of the simulator plug-in causes a function call to be issued to a network stack of an operating system, and wherein the function call causes the network stack to generate a packet.

11. The method of claim 1, wherein a compiled version of a high-level programming language model of the first circuit portion is combined with a compiled version of a simulator plug-in thereby forming a compiled program, and wherein the simulation of the first circuit portion in (a) and (b) involves executing the compiled program.

12. The method of claim 1, wherein netlist information for the first circuit portion and a compiled version of a simulator plug-in are supplied to the first digital logic circuit simulator, and wherein the simulation of the first circuit portion in (a) and (b) involves using the netlist information and the compiled version of the simulator plug-in to determine whether the valid data is being supplied by the first digital logic circuit to the bus interface circuit.

13. The method of claim 1, wherein the first circuit portion is a processor, and wherein substantially all communication between the first circuit portion and the second circuit portion during normal operation of the circuit is across the bus.

14. The method of claim 1, wherein the first circuit portion is an ARM processor, and wherein the bus is an Advanced Microcontroller Bus Architecture (AMBA) standard bus.

15. The method of claim 1, wherein the first circuit portion is an island in a multi-island Network Flow Processor (NFP) integrated circuit, and wherein the bus is a Command/Push/Pull (CPP) bus.

16. The method of claim 1, wherein the packet is communicated in (c) using a stateless communication protocol.

17. The method of claim 1, wherein the first time period is a first bus cycle, and wherein the second time period is a second bus cycle.

18. A system for simulating a first circuit portion of a circuit and a second circuit portion of the circuit, wherein the first circuit portion and the second circuit portion are coupled together by a bus, the system comprising:
   a first computer that: a) executes a first digital logic circuit simulator thereby simulating operation of the first circuit portion during a first bus cycle, wherein during the first bus cycle a first valid signal is generated by the first digital logic circuit simulator that indicates that there is no valid data being output by the first digital logic circuit to be communicated across the bus, and wherein the simulation of the first bus cycle does not cause any packet to be generated that includes bus data of the bus, and b) executes the first digital logic circuit simulator thereby simulating operation of the first circuit portion during a second bus cycle, wherein during the second bus cycle a second valid signal is generated by the first digital logic circuit simulator that indicates that there is valid data being output by the first digital logic circuit to be communicated across the bus, and wherein the simulation of the second bus cycle causes a packet to be generated that does include bus data of the bus; and
   a second computer that is networked to the first computer, wherein the second computer executes a second digital logic circuit simulator thereby simulating operation of the second circuit portion, wherein the bus data of the packet generated by the first computer is used as input data to the second digital logic circuit simulator executing on the second computer.

19. The system of claim 18, wherein the packet generated by the first computer comprises: 1) an indication of a clock tick, and 2) bus data.

20. The system of claim 18, wherein an operating system is executing on the first computer, wherein the operating system comprises a network stack, and wherein the simulation of the first circuit portion causes the packet to be generated by issuing a function call to the network stack of the operating system.

21. A method of simulating a first circuit portion of a circuit and a second circuit portion of the circuit, wherein the first circuit portion and the second circuit portion are coupled together by a bus, the method comprising:
  (a) using a first digital logic circuit simulator to simulate operation of the first circuit portion during a first time period, wherein during the first time period a first valid signal is generated by the first digital logic circuit simulator that indicates that there is no valid data to be communicated across the bus, wherein the simulation of (a) does not cause bus data of the bus to be communicated to a second digital logic simulator, and wherein the simulation of the first circuit is performed by using a computer;
  (b) using the first digital logic circuit simulator to simulate operation of the first circuit portion during a second time period, wherein during the second time period a second valid signal is generated by the first digital logic circuit simulator that indicates that there is valid data to be communicated across the bus, and wherein the simulation of (b) causes bus data of the bus to be communicated to the second digital logic simulator; and
  (c) using the second digital logic circuit simulator to simulate operation of the second circuit portion, wherein the bus data communicated in (b) is used as input data to the second digital logic circuit simulator in (c).

22. The method of claim 21, wherein the first digital logic circuit simulator is executing on a first processor of the computer, wherein the second digital logic circuit simulator is executing on a second processor of the computer, and wherein the bus data communicated in (b) is communicated from the first processor, through a shared memory, and to the second processor.

23. The method of claim 21, wherein the first digital logic circuit simulator is executing on a first processor of the computer, wherein the second digital logic circuit simulator is executing on a second processor of the computer, and wherein the bus data communicated in (b) is communicated from the first processor, through a network stack, and to the second processor.

* * * * *